(12) United States Patent
Laurent

(10) Patent No.: US 8,921,638 B2
(45) Date of Patent: Dec. 30, 2014

(54) METHOD AND FACILITY FOR TREATING CARBONACEOUS RADIOACTIVE WASTE

(71) Applicant: Electricite de France, Paris (FR)

(72) Inventor: Gérard Laurent, Villeurbanne (FR)

(73) Assignee: Electricite de France, Paris (FR)

(*) Notice: Subject to any disclaimer, the term of this patent is extended or adjusted under 35 U.S.C. 154(b) by 242 days.

(21) Appl. No.: 13/749,145

(22) Filed: Jan. 24, 2013

(65) Prior Publication Data

US 2014/0194666 A1 Jul. 10, 2014

(30) Foreign Application Priority Data

Jan. 9, 2013 (FR) ..................................... 13 50165

(51) Int. Cl.
*G21F 9/14* (2006.01)
*G21F 9/06* (2006.01)
*B01D 59/00* (2006.01)
*G21F 9/30* (2006.01)

(52) U.S. Cl.
CPC .. *G21F 9/06* (2013.01); *G21F 9/14* (2013.01); *B01D 59/00* (2013.01); *G21F 9/30* (2013.01)

USPC .............................. 588/18; 588/317; 588/412

(58) Field of Classification Search
USPC ........................ 588/19, 18, 20, 317, 410, 412
See application file for complete search history.

(56) References Cited

U.S. PATENT DOCUMENTS

| 5,909,654 A | 6/1999 | Hesböl et al. |
| 2010/0234664 A1 | 9/2010 | Laurent |
| 2011/0319699 A1* | 12/2011 | Laurent ........................... 588/19 |

FOREIGN PATENT DOCUMENTS

| EP | 1 927 997 A1 | 6/2008 |
| FR | 2 943 167 A1 | 9/2010 |
| WO | WO 01/27935 A2 | 4/2001 |

* cited by examiner

*Primary Examiner* — Edward Johnson
(74) *Attorney, Agent, or Firm* — Drinker Biddle & Reath LLP

(57) ABSTRACT

The invention relates to the treatment of carbonaceous radioactive waste, comprising the delivery of waste to one or more radioactive isotope separation stations isotopes, said isotopes being among at least carbon 14, chlorine 36, and tritium. Advantageously, the delivery to each of the stations occurs in wet form, with water being a common medium for conveying the waste to each of the separation stations.

9 Claims, 2 Drawing Sheets

METHOD AND FACILITY FOR TREATING CARBONACEOUS RADIOACTIVE WASTE

CROSS-REFERENCE TO RELATED PATENT APPLICATION

This application claims the benefit of French Patent Application No. 1350165, filed on Jan. 9, 2013, in the French National Institute of Industrial Property, the entire contents of which is incorporated herein by reference.

BACKGROUND

The invention relates to the treatment of radioactive waste resulting from the operation of nuclear power plants.

It more particularly relates to the treatment of carbonaceous waste, particularly graphite used as a material to absorb neutrons in the sleeves around a reactor.

The graphite can be treated by combustion and/or by steam reforming. A more general proposal here is a treatment from the extraction of the graphite irradiated in the reactor to the treatment of the gases emitted (by combustion or steam reforming the graphite), all while providing the treatments necessary for conditioning the secondary waste resulting from the overall treatment.

The choice of medium for transporting the graphite to the graphite treatment reactor is an important point at this stage because the carrier medium determines the parameters that must be adapted for later treatment of the effluents collected (typically concentrated chlorine 36 ($^{36}Cl$), carbon 14 ($^{14}C$), and tritium ($^{3}H$)), for their subsequent capture or mineralization in order to limit their release into the environment as much as possible.

In one possible embodiment, the graphite as such is treated according to the method described in document FR-2943167, which also describes the collection and processing of effluents.

However, the best possible medium for transporting the graphite remains to be determined.

SUMMARY

The present invention aims to improve the situation.

For this purpose it proposes a method for treating carbonaceous radioactive waste, comprising the delivery of waste to one or more radioactive isotope separation stations, said isotopes being among at least carbon 14, chlorine 36, and tritium.

In one characteristic of the invention, the delivery to each of the stations occurs in wet form.

It has been found in the studies and tests of the Applicant that water is a preferred vector for conveying the waste from the entrance of a waste treatment installation to the radioactive isotope separation stations, or even to their conditioning (for example $^{14}C$ conditioning), according to embodiments presented below in the detailed description.

In one embodiment, specific separation stations are provided for each element among the carbon 14, chlorine 36, and tritium, as well as delivery in wet form to each of these stations.

This embodiment thus proposes a clearly defined separation for the recovery of chlorine 36 on the one hand and tritium on the other, and achieves this due to the routing in wet form.

In one practical implementation, the waste is crushed and mixed with water for delivery in slurry form, before a first isotopic separation, for example separation of the chlorine 36.

More particularly, the waste is mixed with water to form a slurry, then mechanically filtered and dried. The drying is preferably conducted by a mild increase of temperature (less than 1000° C. for example) to avoid releasing radionuclides other than chlorine 36 (the other radionuclides $^{3}H$, $^{14}C$ being released in later steps). The water issuing from this drying then contains all or part of the chlorine 36 initially present in the waste prior to drying.

In one embodiment, the tritium separation occurs after the chlorine 36 separation. The waste is calcined by roasting, then washed. The water recovered from the wash then contains all or part of the tritium initially present in the waste prior to roasting.

In one embodiment, the chlorine 36 and tritium separations precede the treatment of the carbon 14, with the chlorine 36 and tritium being separated from the rest of the carbonaceous waste preferably by leaching.

In one embodiment where at least a part of the waste is calcined by roasting, the waste resulting from the roasting is oxidized to carbon dioxide form for dissolution in the conveying water.

In one embodiment, carbon 14, oxidized to carbon dioxide form, can then be treated by a carbonation reaction in order to be solidified and stored in solid form.

The carbonaceous waste may initially contain graphite. However, the invention applies to other types of carbonaceous waste, such as resins for example.

The invention also relates to an installation for treating carbonaceous radioactive waste (an example is illustrated in FIG. 1, which is discussed below). The installation comprises one or more radioactive isotope separation stations, said isotopes being among at least carbon 14, chlorine 36, and tritium, as well as means of delivering the waste to said stations.

In one characteristic of the invention, the means of delivery are supplied with water in order to route the wastes in wet form.

The treatment installation comprises, for example, supplies of additional water (such as W in FIG. 1, or a supply of water for the conversion into slurry SL, as described below).

BRIEF DESCRIPTION OF THE DRAWINGS

Other features and advantages of the invention will be apparent from reading the following detailed description of example embodiments and from examining the attached drawings, in which.

DETAILED DESCRIPTION

According to the initiated tests, three possibilities can be envisaged for a medium for collecting carbonaceous waste:

a transfer in water, a transfer in gaseous medium in dilute phase, a transfer in gaseous medium and in dense phase.

The following table summarizes the advantages and disadvantages related to each technique.

|  | Water (aqueous slurry composed of graphite in water) | Pneumatic Dilute phase (using nitrogen as carrier gas) | Pneumatic Dense phase (using nitrogen as carrier gas) |
|---|---|---|---|
| Design | Simple | Simpler | More complex |
| Reliability and control | Simple | Easy | More complex |
| Cost of investment | Low | Low, but can increase due to a need for a high capacity nitrogen ($N_2$) installation | Greater than in dilute phase |
| Cost of operation | Low | High, due to the large amount of $N_2$ gas required | Moderate, because smaller amounts of gaseous $N_2$ |
| Secondary waste | Need to treat the volume of wastewater for transferring the graphite | Minimal Transferring dry product can eliminate having to dry the product (eliminates dryer and tank A) | Minimal Transferring dry product can eliminate having to dry the product (eliminates dryer and tank A) |
| Safety | Acceptable Operates at positive pressure | Operates under vacuum Abrasion of graphite particles at high speed produces dust Need for safety controls due to the dust | Not sure of vacuum conditions Can operate under positive pressure |

In the last row of the above table, "positive pressure" is understood to mean a pressure greater than atmospheric pressure, and "vacuum conditions" is understood to mean a pressure lower than atmospheric pressure. Thus, confinement may require some design measures under certain conditions (or an additional confinement barrier). In fact, in a dense pneumatic phase, as with water, it is preferable to be able to pump the graphite to route it.

From this study, it is evident that the "water" medium is the choice to be made for all transfers of carbonaceous waste such as irradiated graphite. This medium offers the best guarantees in terms of confinement and radioprotection.

In addition, it allows easier management of the interfaces between graphite treatment reactors.

According to another result from the study, about 30% (and more generally, a possible range of between 20 and 40%) by weight of graphite in water (as carrier medium) is optimum.

Figure 1:
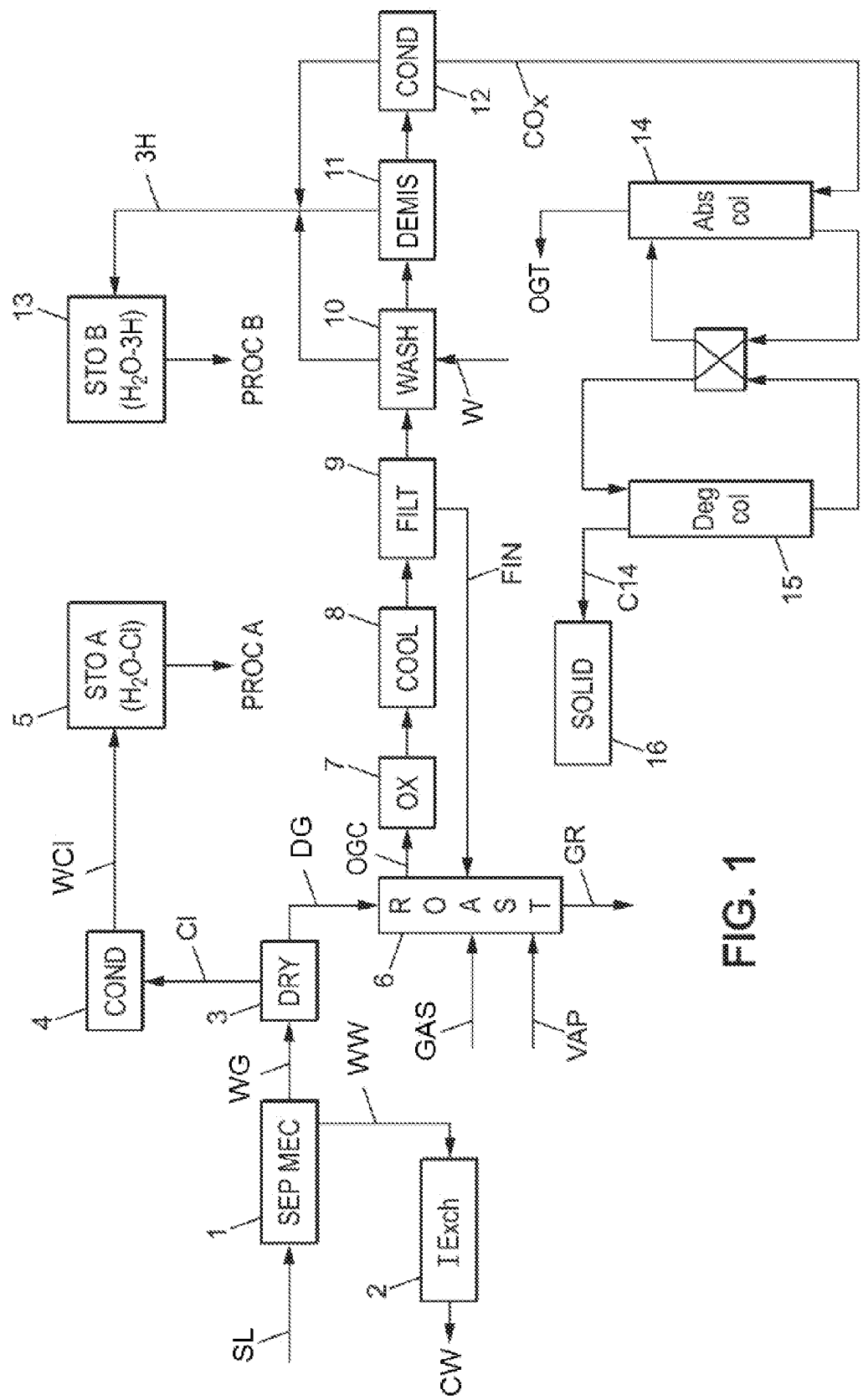
FIG. 1 represents an example of stations in an installation for treating carbonaceous radioactive waste, in the sense of the invention, FIG. 2 summarizes the waste treatment steps conducted in the installation, FIGS. 3A and 3B respectively compare the solubility in water of carbon monoxide and carbon dioxide.

A general diagram of the entire treatment in the sense of the invention is represented in FIG. 1.

First we will refer to FIG. 1, in which a slurry SL, which is a mixture of graphite and water (approximately 30% graphite) resulting from crushing the graphite in water, is delivered to a mechanical separation station 1, where for example it is separated by filtering with centrifugation. Exiting the station 1, a proportion of 90% wet graphite WG is then brought to a dryer 3, while the waste water WW issuing from the mechanical separation station 1 is brought to an isotope filter 2, for example an ion exchanger. The clean water CW filtered in this way can, for example, be fed back into a water supply circuit of a waste treatment installation as shown in FIG. 1.

Exiting from the dryer 3, the water vapor produced from the drying contains most of the chlorine 36 (radioactive isotope) that was initially present in the graphite to be treated. The water vapor Cl containing this isotope $^{36}Cl$ is first sent to a condenser 4 for liquefaction into water WCl containing chlorine 36, and is then stored in a tank A (at station 5), to await specific treatment of the chlorine 36.

The dry graphite DG issuing from the dryer 3 is sent to a heat treatment station 6 where it is roasted. The roasting treatment may be according to the teachings disclosed in document FR 12 60282. For this purpose, there are controlled injections of gases such as hydrogen, carbon monoxide, and carbon dioxide, as well as water vapor. Thus a first high temperature heat treatment (1000-1500° C.) with injection of water vapor can be applied, followed by a second lower heat treatment (800-1200° C.) to utilize the Boudouard reaction with a controlled injection of CO and/or $CO_2$. Such heat treatment sequentially releases first the $^{14}C$ isotope, then the $^{12}C$ isotope, in oxide form.

Thus the first off-gases OGC from the calcination at station 6 essentially contain carbon 14 (radioactive isotope) that should be treated as secondary waste. In one example embodiment, oxidation of any CO present at the exit from station 6 is conducted at station 7 in order to obtain, preferably, $CO_2$, which is more soluble in water than CO, as we will see below. After exiting the cooler 8, a filter 9 collects the smallest solid particles ("fines") in order to reinject them into the heat treatment station 6. The residue issuing from the filtration is soaked and washed with additional water W at station 10 in order to collect the tritium ($^3H$ isotope of hydrogen). In addition, there can be a demister 11 and a condenser 12 to collect the water loaded with tritium in storage tank B (station 13), to await specific treatment of the tritium $^3H$.

The residual gas issuing from the condenser 12 primarily contains only carbon monoxide or dioxide $CO_x$. It can then be sent to a station with absorption 14 and degassing 15 columns. The resulting off-gases OGT are thus treated and the residue from this treatment essentially comprises pure $CO_2$, containing most of the $^{14}C$ issuing from the graphite. This last can then be treated at a station 16, for example by being solidified by carbonation reaction (into the form $CaCO_3$).

Figure 2:
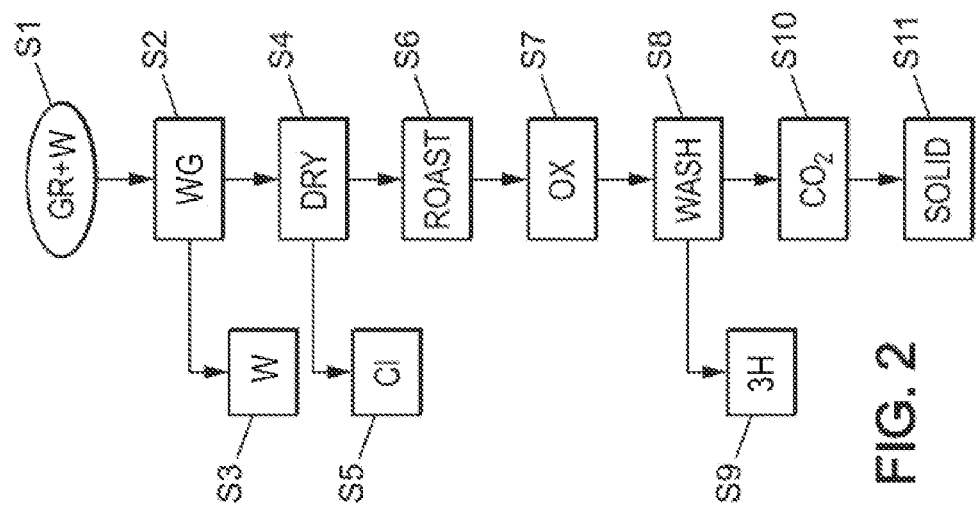

FIG. 2 summarizes the main steps of the treatment, as follows.

In step S1, a graphite slurry, resulting from crushing graphite in water, is obtained and is transferred by pipes to an installation comprising a heat treatment tank, for a roasting phase. In order to be transportable, this slurry contains about 30% graphite and the rest is water.

Step S2 then consists of a first separation (by filtration and/or centrifugation) of the graphite from the water contained in the slurry. Between 5 and 10% w/w of the water remains with the graphite at the end of this step S2.

In step S3, the extracted water is filtered. For this purpose, it is mechanically sent to a reactor building for treatment, for example by water filtration means (conventionally used during the dismantling of UNGG caissons). Another means (reference 2 in FIG. 1) can be an autonomous installation of ion exchange resins and filters for performing this filtration.

In step S4, the wet graphite is then dried in a dryer at high temperature (between 400° C. and 600° C.) in order to eliminate the residual water. The graphite is preferably dry in order to achieve perfect control of oxidation conditions during the graphite heat treatment phase. The drying temperature is carefully chosen in order to dry the graphite without releasing too many radionuclides during this phase. However, between 400 and 600° C., some of the chlorine 36 is inevitably released with the generated vapor. This is collected in tank 'A' of FIG. 1. The proportion of $^{36}Cl$ released can reach 90% here, and that of the $^3H$ can reach 5%, during this phase. Treatment of the water contained in this tank 'A' can be achieved using ion exchange resins in order to capture the $^{36}Cl$ in step S5. It is possible to use the same water filtration system already present at the site for dismantling the internal elements of the reactor, or to add a dedicated resin-based purification system. Tritium can be stored to allow it to decay on site in dedicated tanks, or trapped on metal hydrides, or recycled for other industrial uses. Preferably, the resins containing chlorine 36 are destined for deep storage.

In step S6, the dry graphite is loaded into the calcination installation. This calcination installation and the gases used in it are described in document FR-12 60282. For example this involves heat treatment by roasting, which advantageously obtains the following performances:

eliminating the chlorine 36 which was not eliminated during drying (the remaining 10%), release of 95% of the tritium (remaining residual) and the carbon 14, for an associated mass loss of only 5%.

It should be noted here that one can make use of catalysts (based for example on special metals such as the noble metals platinum, palladium, etc.) to be combined with graphite in powder form in order to improve and encourage oxidation, in a general manner, in the heat treatment stations (in the roaster in this case).

Step S7 concerns the treatment of the generated off-gases. First, they enter a catalytic oxidation device in order to convert the carbon monoxide CO into carbon dioxide $CO_2$. Next the stream of off-gases is cooled, then filtered. Any solid elements present in the off-gases are filtered from the stream and returned to the calcination installation.

Step S8 concerns the collection of effluents. The cooled off-gases are then wetted and washed (reverse flow). The vapor that was introduced into the installation then condenses. The tritium and chlorine 36 are eliminated here (step S9). The collected water is transferred to tank 'B'. This tank then contains the major portion of the tritium and the remainder of the chlorine 36 (10% remaining after drying the graphite). It also contains a small amount of $^{14}C$ originating from the absorption of $CO_2$ in water. Catalytic oxidation of CO is preferably used here because $CO_2$ is more soluble in water. The treatment for the $^{36}Cl$ and $^3H$ contained in tank 'B' is similar to the treatment for the $^{36}Cl$ and $^3H$ contained in tank 'A' (step S4 above).

Figure 3A:
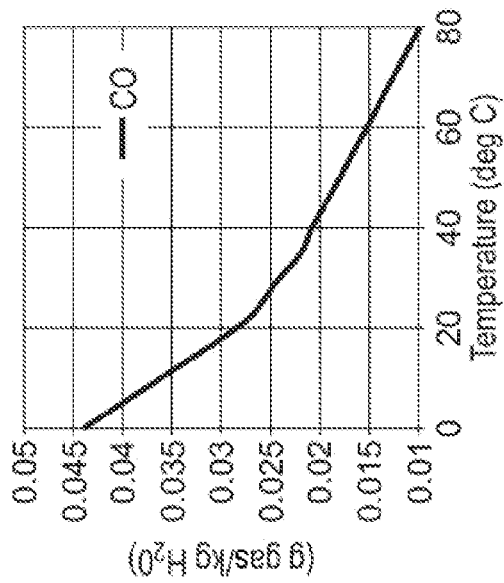
Figure 3B:
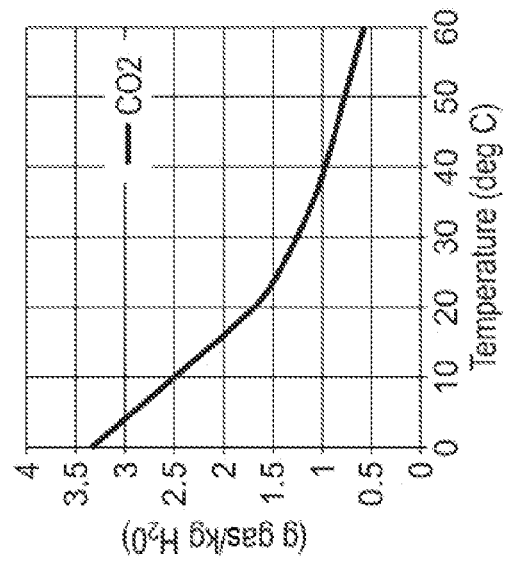

For example, $CO_2$ at $9.25\ 10^{-3}$ TBQ can be dissolved in 430 m$^3$ of water, while only $1.85\ 10^4$ for CO can be dissolved in the same amount of water (see solubility curves in FIGS. 3A and 3B).

The temperature of these liquids (primarily water but also a mixture with a small amount of sodium hydroxide NaOH in order to improve the $CO_2$ elimination described below) is about 40° C.

Elimination of the $CO_2$ containing most of the $^{14}C$ is conducted in step S10 in the off-gases issuing from the collection of effluents in step S8. The off-gases then circulate to a $CO_2$ elimination system, based for example on a chemical absorption technique, generally using a type of amine to capture the $CO_2$. The absorption tank provides a means of bringing the gas in contact with a chemical solvent, generally an organic amine, which absorbs most of the $CO_2$ by reacting to form a bound compound. The solvent, rich in $CO_2$, is then transferred to another vessel (the degassing column 15 of FIG. 1) where it is heated with steam to reverse the $CO_2$ absorption reactions. The $CO_2$ released in the degassing column can be collected and compressed for storage or to form a solid residue after the mineralization reactions in step S11 (for example forming solid carbonate $CaCO_3$). Recovery levels for the $CO_2$ that exceed 95% can be obtained using current techniques.

If needed, more sophisticated solutions of absorbents could be used to improve this ratio.

In the following table, a capture rate of 95% is assumed, which means that a fraction (2.25 TBq per year of $^{14}C$) exits the system in the off-gases treated as described above.

A mass loss related to the entire treatment that is barely above 5% is achieved.

The main streams and the inventory of the radionuclides in each stream that must be solidified or treated in order to eliminate them are given in the following table:

|   | T/Yr | $^{36}Cl$ TBq/Yr | $^3H$ TBq/Yr | $^{14}C$ TBq/Yr |
|---|---|---|---|---|
| Calcined graphite | 950.00 | 0.00 | 4.75 | 5.00 |
| Storage tank A - Liquids | 233.33 | 0.45 | 2.50 | 0.00 |
| Storage tank B - Liquids | 431.50 | 0.05 | 42.75 | 9.25E−03 |
| Compressed $CO_2$ | 3755.76 | 0.00 | 0.00 | 42.74 |

FIGS. 3A and 3B compare the solubility in water of CO to that of $CO_2$, showing in particular that carbon dioxide is much more soluble in water than carbon monoxide, which offers water as a vector of choice for treating carbonaceous waste and particularly graphite, in its oxidized form $CO_2$.

The solubility of CO and $CO_2$ in water can then be used as providing an approximation of the amount of $C^{14}O_2$ ultimately absorbed in the water at the end of the treatment.

Compressed $CO_2$ can then be mineralized by conventional techniques, for example into carbonates (typically $CaCO_3$) or carbides (for example into silicon carbide SiC), or recycled for use in industry or health care (for hospital examinations for example, as the developer in medical imaging).

The example represented in FIG. 1 uses the option of treating the carbon 14 in the form of carbon dioxide $CO_2$. In a first embodiment, this solution may be preferred because of potential safety issues with CO which can generate additional costs and complexity. By converting the CO into $CO_2$ as soon as it exits the roaster, a major problem related to potential hazards concerning safety, explosion, poisoning, or radiotoxicity of the gaseous CO is avoided. The presence of CO as a gas requires a large number of tests which increases the treatment cost. The gas when it exits the treatment illustrated in FIG. 1 thus contains pure $CO_2$, at more than 90%, which can be made to react by a simple chemical reaction to form a carbonate or another product, without excessive costs.

On the other hand, it may be advantageous to keep the carbon monoxide if the choice is made to implement solid conditioning in SiC (silicon carbide) or carbon black, for example, as SiC occupies less storage space than $CaCO_3$.

One will thus understand that the choice of whether to treat CO or $CO_2$ at the end of the decontamination may depend on an optimization between:
- the safety of treating $CO_2$ compared to treating CO,
- the ease of producing a stable compound acceptable for storage, from CO or from $CO_2$,
- the volume of the final product (silicon carbide, or carbonates).

Of course, the invention is not limited to the example embodiments described above; it extends to other variants.

For example, a treatment of carbonaceous waste containing graphite has been described. The invention could, however, be applied generally and in the same manner to treating other types of carbonaceous waste, such as resins.

Also, storage containers 5, 13, 16 have been described as essentially containing the respective radioactive elements $^{36}Cl$, $^{3}H$ and $^{14}C$. However, a small amount of $^{3}H$ can of course be present in tank A (reference 5 in FIG. 1) or, conversely, a certain amount of $^{36}Cl$ may be present in tank B (reference 13). The amounts present depend in particular on the thermal conditions of the drying (at station 3) and roasting (station 6). In one example embodiment, they conform to the teachings of documents FR-2943167 (publication number) and FR-12 60282 (application number). However, variants in the thermal conditions for these treatments can be envisaged without any significant impact on the invention.

The invention claimed is:

1. A method for treating carbonaceous radioactive waste, comprising the delivery of waste to one or more radioactive isotope separation stations, said isotopes being among at least carbon 14, chlorine 36, and tritium,
   wherein the delivery to each of the stations occurs in wet form,
   the method comprising:
   providing a leaching to separate the chlorine 36 and the tritium from the rest of the carbonaceous waste so as to deliver the chlorine 36 and the tritium in at least one first separation station, and
   after separations of the chlorine 36 and the tritium from the rest of the carbonaceous waste, treating the rest of the carbonaceous waste so as to deliver the carbon 14 in a second separation station.

2. The method according to claim 1, wherein specific separation stations are provided for each element among the carbon 14, chlorine 36, and tritium, as well as delivery in wet form to each of said stations.

3. The method according to claim 1, wherein the waste is crushed and mixed with water for delivery in slurry form, before a first isotopic separation.

4. The method according to claim 1, wherein the waste is mixed with water to form a slurry, then mechanically filtered and dried, and wherein the water issuing from this drying contains all or part of the chlorine 36 initially present in the waste prior to drying.

5. The method according to claim 1, wherein, after separating the chlorine 36, the waste is calcined by roasting, then washed, and wherein the water recovered from the wash contains all or part of the tritium initially present in the waste prior to roasting.

6. The method according to claim 1, wherein, with at least a portion of the waste being calcined by roasting, the waste resulting from the roasting is oxidized to carbon dioxide form for dissolution in the conveying water.

7. The method according to claim 1, wherein the carbon 14 is put in carbon dioxide form for treatment by carbonation reaction, in order to be solidified and stored in solid form.

8. The method according to claim 1, wherein the carbonaceous waste initially contains graphite.

9. A facility for treating carbonaceous radioactive waste, comprising one or more radioactive isotope separation stations, said isotopes being among at least carbon 14, chlorine 36, and tritium, as well as means of delivering the waste to said stations,
   wherein the means of delivery are supplied with water in order to deliver the waste in wet form,
   said facility including a leaching stage to separate the chlorine 36 and the tritium from the rest of the carbonaceous waste and to deliver the chlorine 36 and the tritium in at least one first separation station of the facility, and
   a reactor for treating the rest of the carbonaceous waste so as to deliver the carbon 14 in a second separation station of the facility.

* * * * *